US007869375B2

(12) United States Patent
Crisp et al.

(10) Patent No.: US 7,869,375 B2
(45) Date of Patent: Jan. 11, 2011

(54) METHOD FOR PREDICTING A FAULT IN A SECURITY SYSTEM

(75) Inventors: Martin Crisp, North Lanakshire (GB); Paul Dagostino, Ayrshire (GB); Craig Fleming, South Lanarkshire (GB)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 12/337,780

(22) Filed: Dec. 18, 2008

(65) Prior Publication Data

US 2009/0201820 A1 Aug. 13, 2009

(30) Foreign Application Priority Data

Dec. 31, 2007 (EP) ................................. 07124187

(51) Int. Cl.
*H04L 12/26* (2006.01)
(52) U.S. Cl. ...................................... 370/242; 370/216
(58) Field of Classification Search ................. 370/242, 370/216–228, 248, 252, 253, 310; 340/539
See application file for complete search history.

(56) References Cited

U.S. PATENT DOCUMENTS

| 5,159,593 | A | * | 10/1992 | D'Amico et al. ............. 370/332 |
| 6,150,936 | A | * | 11/2000 | Addy ....................... 340/539.2 |
| 2007/0008117 | A1 | * | 1/2007 | Parker et al. ............ 340/539.21 |
| 2007/0208537 | A1 | * | 9/2007 | Savoor et al. ................ 702/182 |
| 2008/0129494 | A1 | * | 6/2008 | Kim et al. ............... 340/539.22 |

\* cited by examiner

*Primary Examiner*—Ricky Ngo
*Assistant Examiner*—Gary Mui
(74) *Attorney, Agent, or Firm*—Husch Blackwell Welsh Katz

(57) ABSTRACT

A method for predicting a fault in a wireless communication path between at least one transmitter and a receiver. The method comprises detecting an initial value of a characteristic of a reception signal or an initial value of a characteristic of a wireless communication path, calculating a running average of the same characteristic for preset period of time, comparing the initial value with the calculated running average; and displaying an indication based upon an analysis of the comparing. The indication is transmitted to a remote site for response. The characteristic can be signal strength, noise and a S/N ratio.

12 Claims, 8 Drawing Sheets

|  | Noise ref | Noise hr | Noise day | Noise week | Noise month |
|---|---|---|---|---|---|
| Noise ref | X | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 |
| Noise hr | 10%<Δ<20% =1<br>20%<Δ<30% =2<br>30%<Δ<50% =3<br>50%<Δ<70% =4<br>70%<Δ<100% =5 | X | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 |
| Noise day | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | X | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 |
| Noise week | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | X | 10%<Δ<20% =1<br>20%<Δ<30% =2<br>30%<Δ<50% =3<br>50%<Δ<70% =4<br>70%<Δ<100% =5 |
| Noise month | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | 10%<Δ<20% =1<br>20%<Δ<30% =2<br>30%<Δ<50% =3<br>50%<Δ<70% =4<br>70%<Δ<100% =5 | X |

METHOD FOR PREDICTING A FAULT IN A SECURITY SYSTEM

This application claims benefit of and priority to European Patent Application No. 07124187.1 filed in the European Patent Office on Dec. 31, 2007, the contents of which are incorporated by this reference.

FIELD OF THE INVENTION

This invention relates to wireless communication devices. More particularly, the invention relates to a system and method for monitoring characteristics of a communication path and a reception signal and predicting a fault or error in the path.

BACKGROUND

Wireless devices are used in security systems as a backbone of communication for the systems. It is essential that the communication path is available 100% of the time to ensure system integrity. However, due to external influences within a protected premise, this is not always the case. The signal path can be temporarily or permanently blocked, attenuated over time, and flooded with external noise.

Ambient noise levels and attenuation characteristics of the environment vary over time. If a received signal strength is close to the noise floor of the detector of the receiver, the signal can be overpowered by the noise and the transmission lost.

The variance in noise and attenuation cannot be complete prevented; therefore, there is a need to be able to predict a failure as a result of the variance before it occurs.

SUMMARY OF THE INVENTION

Accordingly, disclosed is a method for predicting a fault in a wireless communication path between at least one transmitter and a receiver. The method comprises detecting an initial value of a characteristic of a reception signal or an initial value of a characteristic of a wireless communication path, calculating a first running average of the characteristic for preset period of time, comparing the initial value with the calculated first running average; and displaying an indication based upon an analysis of the comparison.

The method further comprises calculating a second running average of a characteristic over a second preset period of time, comparing the first and second calculated running averages and displaying an indication based upon an analysis of the comparison. The second preset period of time is different than the preset period of time.

The characteristic of the reception signal is signal strength. The characteristic of the communication path can be a noise, such as ambient noise. Additionally, the characteristic can be a signal to noise ratio in the reception signal.

The calculating step includes the sub-steps of converting the reception signal into a digital signal, sampling the digital signal at least a predetermined number of times, counting a number of samples, multiplying the samples when the counter reaches a preset number with a weighting coefficient, and adding the multiple samples. The weighting coefficient for a last sample is different from the other weighting coefficients.

The analysis of the comparing includes the sub-steps of determining if a variance between the initial value and the calculated running average is within a plurality of threshold ranges and generating the indication based upon the determining. The indication is distinct for each of the plurality of threshold ranges. Each of the threshold ranges representing a distinct reporting event.

The method further comprises transmitting the indication to a remote monitoring station and responding to the indication. The response is different for each distinct indication. A response can be moving a location of a receiving device.

BRIEF DESCRIPTION OF THE FIGURES

These and other features, benefits and advantages of the present invention will become apparent by reference to the following text and figures, with like reference numbers referring to like elements across the views, wherein:

FIG. 6 illustrates an exemplary decision table for the noise characteristic.

DETAILED DESCRIPTION OF THE INVENTION

The present invention includes a system and method for predicting a fault in a communication path between at least one transmitter and a receiver. The predicting system uses characteristics of communication path such as noise, signal strength and S/N to predict a fault and to optimize the location of the receiver and transmitters.

The predicting system has an advantage that during installation, the location of the receiver and transmitters can be optimized by analyzing characteristics of the electromagnetic environment. Additionally, after installation, the predicting system has an advantage in that service or maintenance of the receiver or transmitters can be schedule in advance without a significant downtime in the system.

Figure 1:
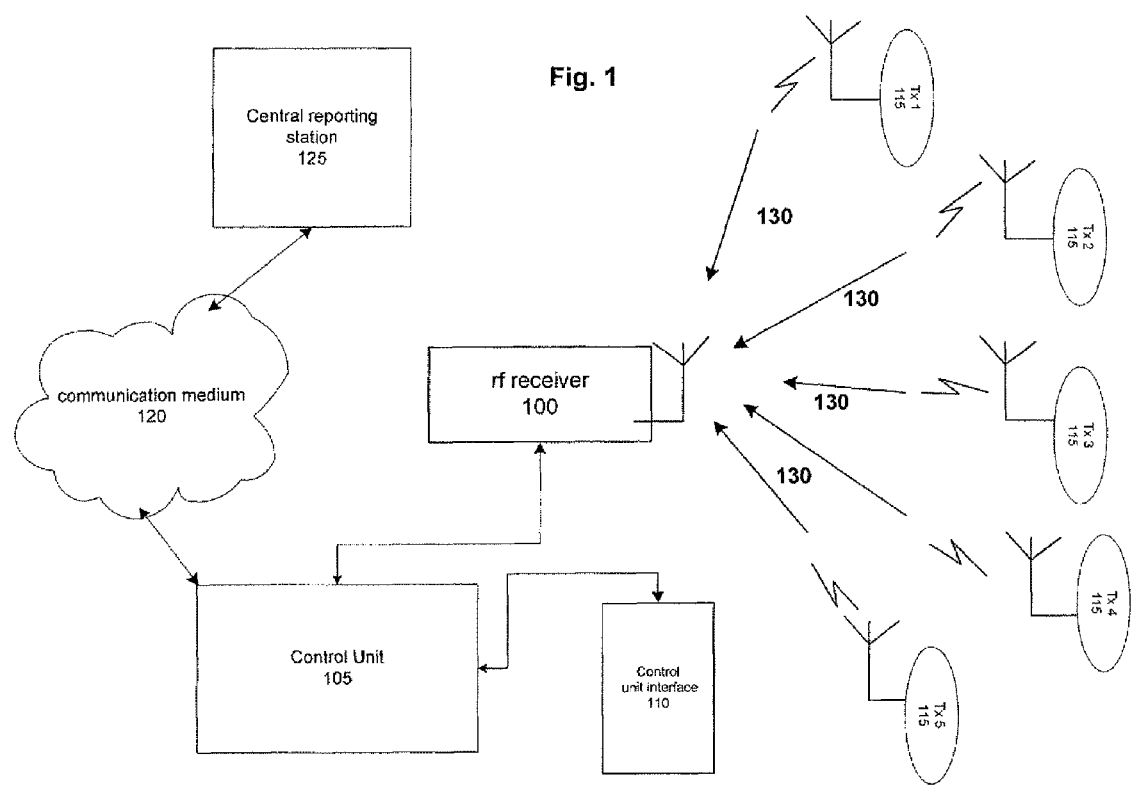
FIG. 1 is a diagram of the components of a system in accordance with an embodiment of the invention.

FIG. 1 illustrates a diagram of an example of a predicting system. As depicted five transmitters 115 are capable of transmitting data to an rf receiver 100. The transmitters 115 transmit an RF signal via communication path 130. The rf receiver 100 is coupled to a control unit 105. The control unit 105 performs the signal processing and analysis in accordance with the invention. The control unit 105 includes a memory section for storing profiles of a received signal and decision thresholds, in the form of at least one decision table. The control unit 105 also includes a signal detector for measuring at least one characteristic of the communication path 130 or received signal. A characteristic can be noise, received signal strength and a S/N value.

Additionally, the control unit 105 can include an A/D converter to provide digital signals for processing and analysis. In an embodiment, the A/D converter is adapted to read a voltage span between 0V and 2.8V. The A/D converter has a resolution of N-bits. For example, in an embodiment, the A/D converter has a resolution of 10-bits.

The control unit 105 also includes two running average calculating sections: one for calculating a running average of the noise (RNA) and the other for calculating a running average of the signal strength (RSA). The running average calculating sections include a counter for counting the number of data points needed for the running average or the number of samples of the A/D converted signal. For example, the A/D converter signal is sampled 10 times per second. The running average calculating sections act as a virtual filter.

Ambient noise dynamically changes. The change makes it difficult to determine the correct moment to take a noise floor measurement and be confident that it is accurate. In an embodiment of the invention, a running average of the noises is calculated using the following formula $$RNA=(0.9*RNA)+(0.1*NNS) \quad (1)$$

where RNA is the running noise average and NNS is the next noise sample.

This running average or virtual filter will be used at various levels of the noise profile i.e., seconds, minutes, hourly, daily, weekly, and monthly.

The coefficient weighting allows transients to have little effect on the resultant average and thus gives a more accurate reading over a more significant period. The coefficient weighting can be varied.

A running average (RNAsec) is calculated from the 10 samples. A running average (RNAmin) is then calculated over a 1 minute period using 60 RNAsecs. A running average (RNAhour) is then calculated over a 1 hour period using 60 RNAmins. Every time RNAhour is updated a copy of the new value will be stored in a large buffer circular buffer of 168 words (7 days). A running average (RNAday) is also calculated over a 24 hour period using 24 RNAhours. A running average (RNAweek) is also calculated over a 7 day period using 7 RNAdays. A running average (RNAmonth) is also calculated over a 4 week period using 4 RNAweeks.

The control unit 105 further includes a transmission section for transmitting an indication to a central reporting station 125. The transmission section can be a wireless communication device. The transmission section transmits the notification via a communication medium 120.

The control unit 105 can be controlled using a control unit interface 110. The control unit interface 110 can include a keyboard and a display. The installer can use the keyboard to program the control unit 105. The control unit 105 is capable of displaying an indication on the display.

Figure 2:
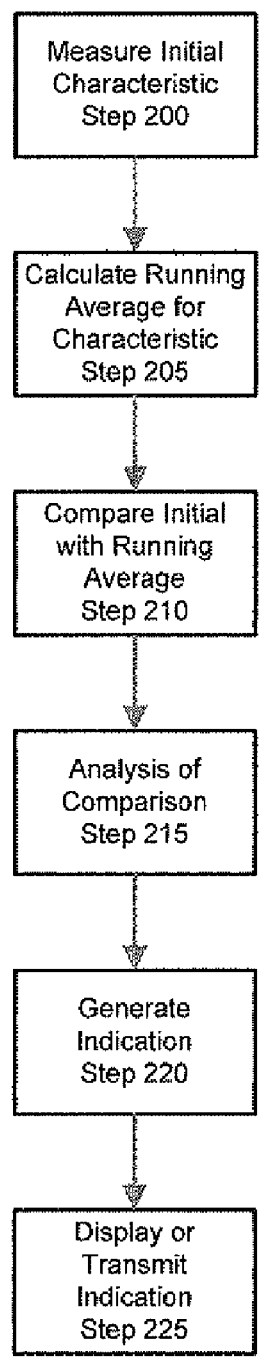
FIG. 2 is a flow chart of the prediction method according to an embodiment of the invention.
Figure 4:
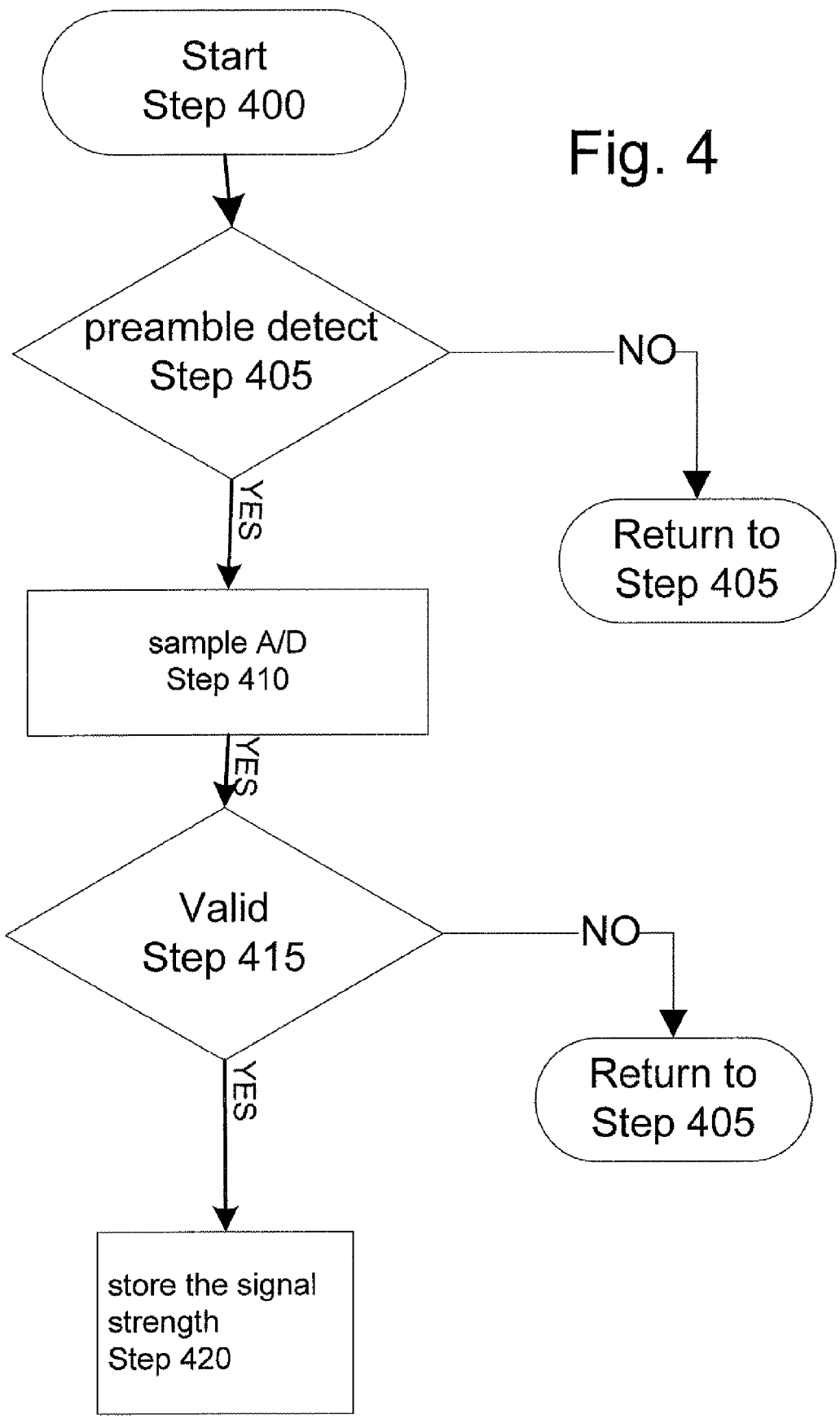
FIG. 4 is a flow chart for detecting an initial signal characteristic according to an embodiment of the invention.

FIG. 2 illustrates a flow diagram for the prediction method according to an embodiment of the invention. At step 200, the control unit 105 measures at least one initial characteristic of the communication path 130 or received signal. The characteristic can be a noise, a signal strength and/or S/N. The initial characteristic is stored in memory, i.e., memory section. For example, FIG. 4 illustrates a method for detecting initial received signal strength. Signal strength measurement taken at installation is the basic reference for signal strength measured over time. In an embodiment, the noise level at installation time is also measured.

At step 205, at least one running average calculating section calculates a running average of the characteristic, e.g., the same characteristic. The calculation for the running noise average will be described in FIG. 3.

At step 210, the control unit 105 compares the stored initial value with the calculated running average for at least one period of time and analyzes the comparison. FIGS. 5-8 illustrate the analysis based upon the characteristic. In an embodiment, the signal strength is monitored in relation to the noise level over the duration of its life.

Specifically, the values are analyzed for a variance over time. Noise and signal strength boundaries can be defined to trigger specific fault/trouble conditions depending on the weighting given to the trouble condition. For example, if the initial noise value increases over time an indication can be generated. Additionally, if the received signal strength decreases over time, an indication can be generated. At step 220, an indication is generated based upon specific predefined trigger points. In an embodiment, there are five trigger points or thresholds. Each trigger point causes a different indication to be generated, e.g., a distinct flag. These trigger points will be described later in detail.

At step 225, the generated indication is either displayed on the control unit interface 110 or transmitted to the central reporting station 125.

Figure 3:
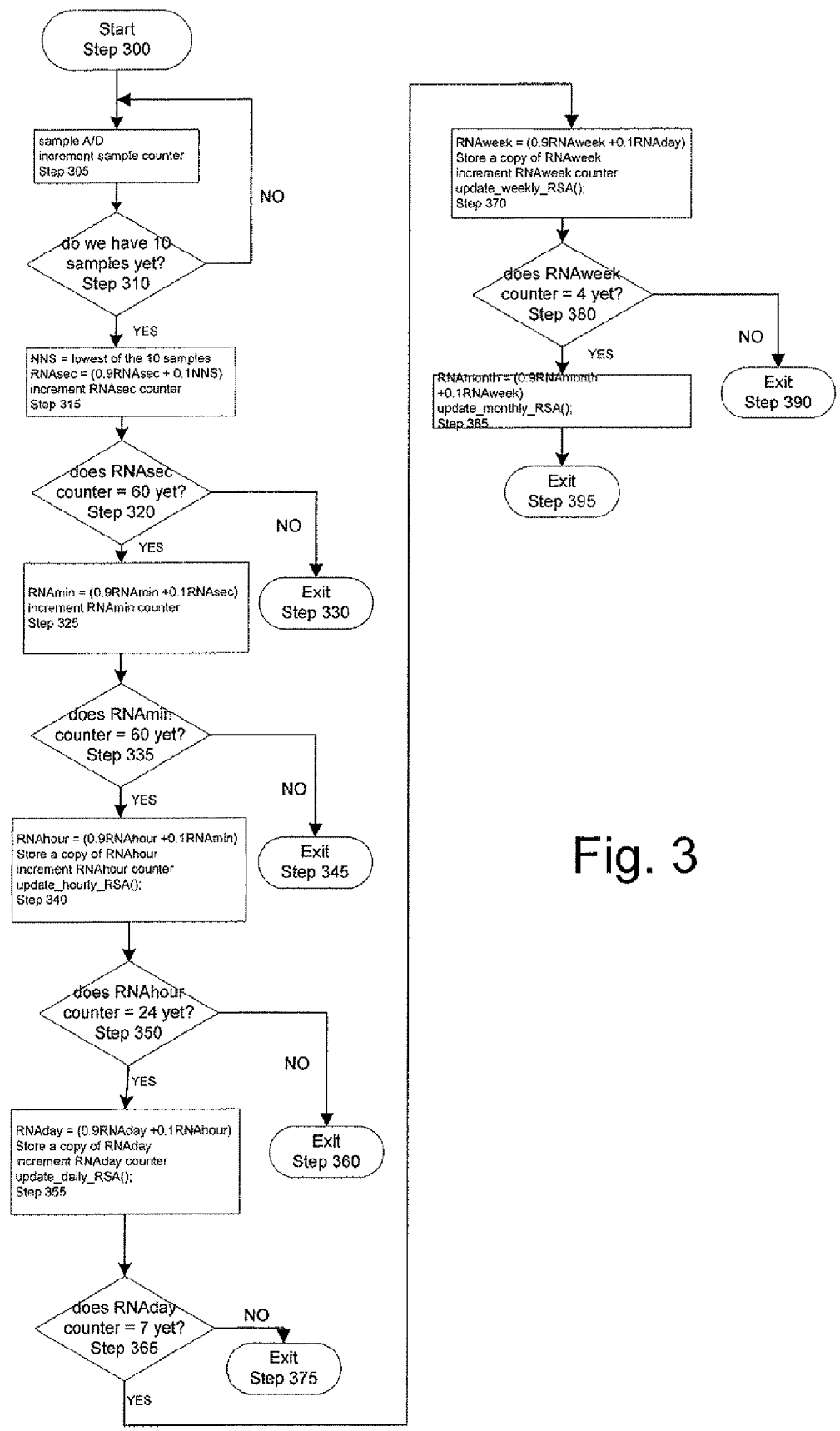
FIG. 3 is a flow chart for calculating a running average of the noise according to an embodiment of the invention.

FIG. 3 illustrates a flow chart for calculating a running average of the noise (RNA) for multiple time periods.

The process starts at step 300. At step 305, the digital signal is sampled. The A/D converted signal is sampled 10 times per second. The sampled signal is temporarily buffered. Additionally, at step 305, a counter is incremented by 1 for each sample. The counter tracks the number of samples taken. This counter value is used to determine when to calculate the RNAsec. At step 310, the control unit 105 determines if ten (10) samples have been taken. Ten samples are needed for the calculation of the RNAsec. If ten samples have not been taken, the process returns to step 305. If ten samples have been sampled and buffered, the process moves to step 315.

At step 315, the RNAsec is calculated. As noted above, the running average is calculated using the equation RNA= (0.9*RNA)+(0.1*NNS). The running average calculating section assigns the last sample as the NNS and then calculates the RNAsec using equation 1. After the RNAsec is calculated, a counter is incremented by 1. The RNAsec is buffered temporarily. The RNAsec counter tracks the number of RNAsecs calculated. This counter value is used to determine when to calculate the RNAmin. 60 RNAsecs are needed to calculate the RNAmin.

At step 320, the control unit 105 determines if the counter=60. If the counter does not equal 60, the process is exited at step 330. If the counter equals 60, then the process moves to step 325. At step 325, the running average calculating section calculates the RNAmin. The running average calculating section assigns the RNAsec as the NNS and then calculates the RNAmin using equation 1. After the RNAmin is calculated, a counter is incremented by 1. The RNAmin counter tracks the number of RNAmins calculated. This counter value is used to determine when to calculate the RNAhour. 60 RNAmins are needed to calculate the RNAhour.

At step 335, the control unit 105 determines if the counter=60. If the counter does not equal 60, the process is exited at step 345. If the counter equals 60, then the process moves to step 340. At step 340, the running average calculating section calculates the RNAhour. The running average calculating section assigns the RNAmin as the NNS and then calculates the RNAhour using equation 1. After the RNAhour is calculated, a counter is incremented by 1. The RNAhour counter tracks the number of RNAhour calculated. This counter value is used to determine when to calculate the RNAday. 24 RNAhours are needed to calculate the RNAday. Additionally, at step 340, a Hourly_RSA( ) is updated. A copy of the RNAhour value is stored in memory.

At step 350, the control unit 105 determines if the counter=24. If the counter does not equal 24, the process is exited at step 360. If the counter equals 24, then the process moves to step 355. At step 355, the running average calculating section calculates the RNAday. The running average calculating section assigns the RNAhour as the NNS and then calculates the RNAday using equation 1. After the RNAday is calculated, a counter is incremented by 1. The RNAday counter tracks the number of RNAday calculated. This counter value is used to determine when to calculate the RNAweek. 7 RNAdays are needed to calculate the RNAweek. Additionally, at step 355, a daily_RSA( ) is updated. A copy of the RNAday value is stored in memory.

At step 365, the control unit 105 determines if the counter=7. If the counter does not equal 7, the process is exited at step 375. If the counter equals 7, then the process moves to step 370. At step 370, the running average calculating section calculates the RNAweek. The running average calculating section assigns the RNAday as the NNS and then calculates the RNAweek using equation 1. After the RNAweek is calculated, a counter is incremented by 1. The RNAweek counter tracks the number of RNAweek calculated. This counter value is used to determine when to calculate the RNAmonth. 4 RNAweeks are needed to calculate the RNAmonth. Additionally, at step 370, a Week_RSA( ) is updated. A copy of the RNAweek value is stored in memory.

At step 380, the control unit 105 determines if the counter=4. If the counter does not equal 4, the process is exited at step 390. If the counter equals 4, then the process moves to step 385. At step 385, the running average calculating section calculates the RNAmonth. The running average calculating section assigns the RNAweek as the NNS and then calculates the RNAmonth using equation 1. Additionally, at step 385, a month_RSA( ) is updated. The process is exited at step 395.

Every time a transmitter 115 transmits data to the rf receiver 100 the signal strength is noted. FIG. 4 illustrates a flow chart for the detection of the signal strength of a signal from a transmitter 115. The process begins at step 400. At step 405, a preamble in the signal is detected. Signal strength is measured during the preamble period. The signal is converted into a digital signal. The A/D converted signal is sampled and the strength is measured at step 410. At step 415, the control unit 105 determines if the measured signal strength is valid, i.e., signal detector or signal detection section. If the measured signal strength is valid, the signal strength is recorded in memory as a reference value for later comparison. If the measured signal strength is not valid, the process returns to step 405. Acceptable or valid signal strength is defined as a percentage above the noise level. In an embodiment, the valid signal strength is 5% above the initial noise. This percentage is selected to be high enough to stay safely above any noise fluctuations over time. If the strength is not sufficient greater than the noise, the rf receiver 100 or transmitter 115 will be moved to a different location.

The running average of the signal strength is calculated using the similar equation as the running average for noise. The equation is $$RSA = (0.9 * RSA) + (0.1 * NSS) \quad (2)$$

where RSA is the running signal strength average and NSS is the next signal sample.

The running average or virtual filter is calculated at various levels of the signal strength trends e.g., minutes, hourly, weekly, and monthly. The running average provides a long term signal strength profile which, combined with noise level trends allow a more accurate picture of the over all system. The coefficient weighting allows transients to have little effect on the resultant average and thus gives a more accurate reading over a more significant period.

The calculation of the running average for signal strength is similar to the calculation of the running average for noise and, therefore, will not be described in detail.

Figure 5:
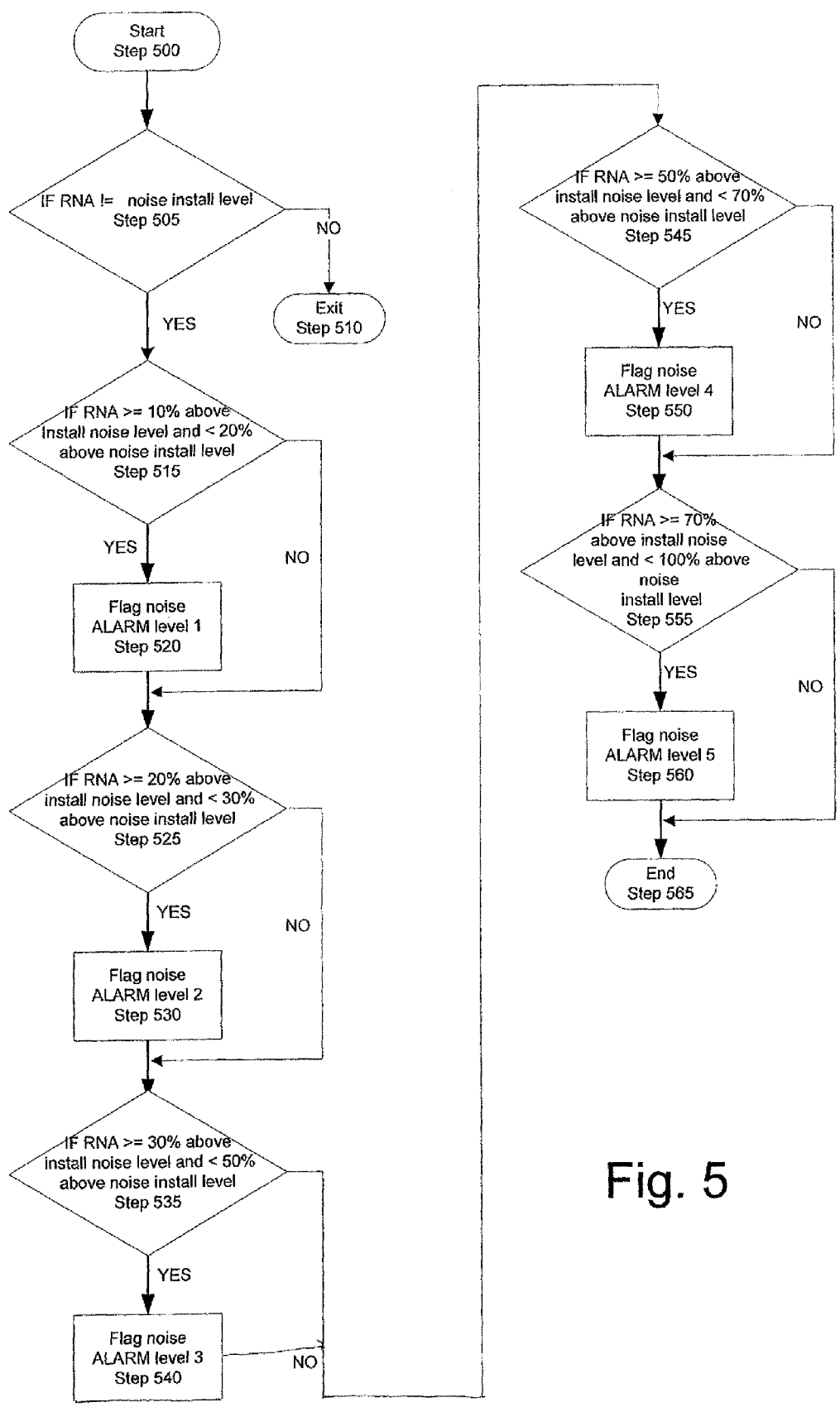
FIG. 5 is a flow chart for method steps in the analysis of the running average of the noise in comparison with the initial noise value and generation of an indication according to an embodiment of the invention.

Once the running averages and initial measurements are taken or calculated, the values are compared and analyzed, i.e., steps 215 and 220. FIG. 5 illustrates an example of a comparison and analysis of the values according to an embodiment of the invention. Specifically, FIG. 5 illustrates the analysis of the RNA and the initial installed noise level. The analysis compares the variances in the noise level over a period of time with specific trigger points. As depicted in FIG. 5, there are five different trigger points. Each trigger point corresponds to a given range of change. For example, trigger point 1 corresponds to a range of 10% to 20% increase in noise. The use of five trigger points is only by way of example. Any number of trigger points can be used. Additionally, the particular ranges for each trigger point can be varied. Furthermore, the specific RNA period used for the comparison can be changed based upon the specific needs of the system. A shorter RNA period will allow for greater control and prediction ability, however, more indications are used.

As depicted, the process begins at step 500. At step 505, the calculated RNA is compared with the initial noise level. If the calculated RNA is the same as the initial noise level, the process ends. However, if the RNA is not the same, decision steps 515, 525, 535, 545, and 555 sequentially occur. There is a decision step for each trigger point, e.g., 1-5. The control unit 105 first checks for the range corresponding to trigger point 1, then moves on to points 2, 3, 4, and finally 5. Once the control unit 105 determines that one of the percentage ranges is satisfied for the RNA and initial noise comparison, a flag for the corresponding trigger point is set. For example, if the RNA is greater than or equal to 10% and less than 20% above the initial noise value ("yes" at step 515), a flag corresponding to the trigger point 1 is set (step 520). If the RNA is greater than or equal to 20% and less than 30% above the initial noise value ("yes" at step 525), a flag corresponding to the trigger point 2 is set (step 530). If the RNA is greater than or equal to 30% and less than 50% above the initial noise value ("yes" at step 535), a flag corresponding to the trigger point 3 is set (step 540). If the RNA is greater than or equal to 50% and less than 70% above the initial noise value ("yes" at step 545), a flag corresponding to the trigger point 4 is set (step 550). Similarly, if the RNA is greater than or equal to 70% and less than 100% above the initial noise value ("yes" as step 555), a flag corresponding to the trigger point 5 is set (step 560). The process ends at step 565. As described above, the flag can either be displayed on the control unit interface 110 or transmitted via the communication medium 120 to the central reporting station 125. FIG. 5 depicts the decision process for the comparison of the initial noise value and RNA, however, two different RNA values can also be compared to generate a flag. For example, an RNAmin and RNAhour can be used instead as the decision variables. Accordingly, at step 505, instead of comparing the initial noise level with the RNA, a comparison of the RNAmin is made with respect to RNAhour.

In an embodiment, the control unit 105 uses a decision table stored in memory to determine which flag to set. FIG. 6 illustrates an example of a decision table 600 stored in memory used for noise. The decision table 600 includes columns and rows. There are five columns and rows representing five different periods of time: initial measurement, RNAhour, RNAday, RNAweek and RNAmonth. Any period of time can be compared with any other period of time.

Figure 7:
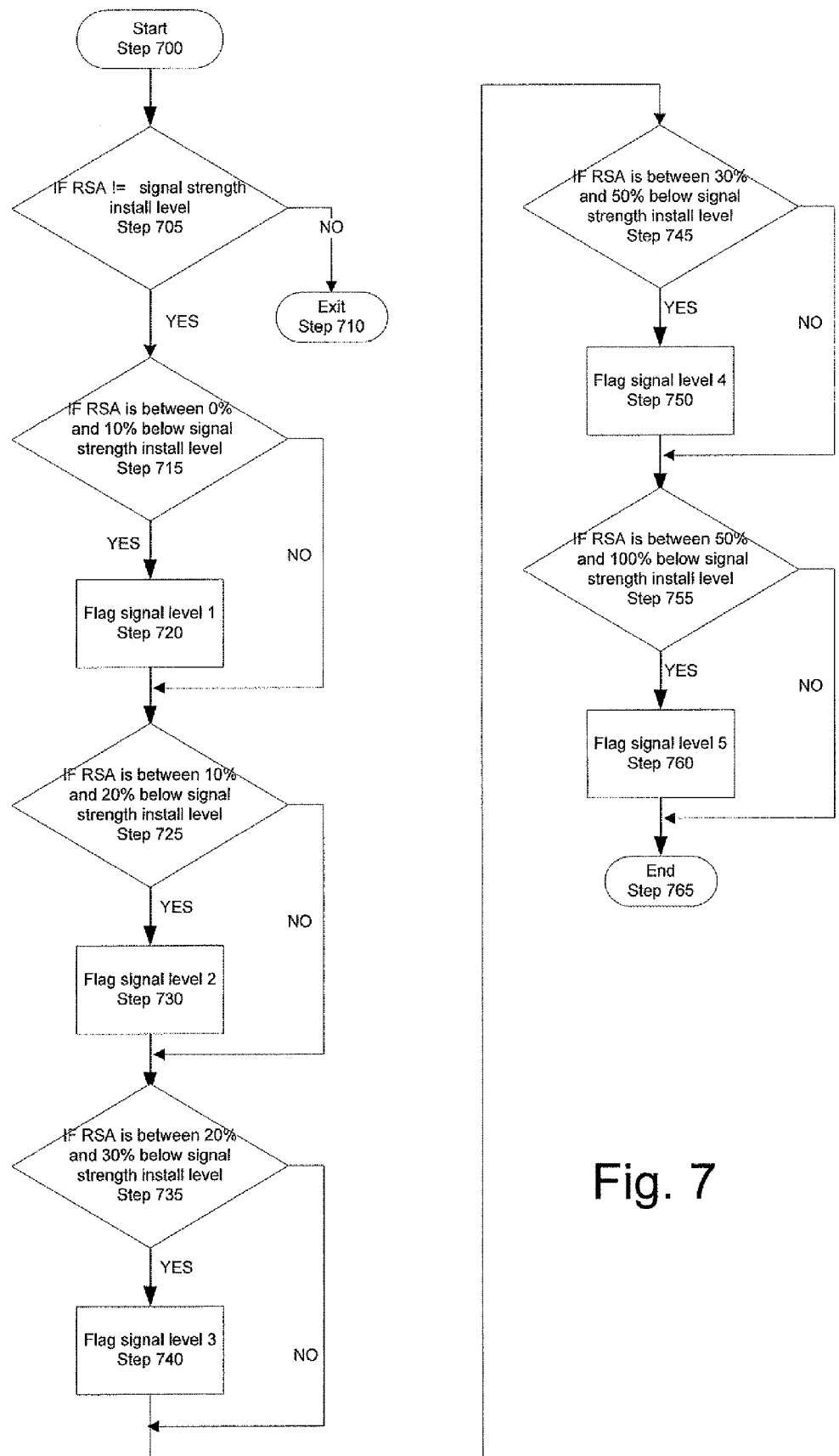
FIG. 7 is a flow chart for method steps in the analysis of the running average of the signal strength in comparison with the initial strength value and generation of an indication.

FIG. 7 illustrates an example of the comparison, analysis and flag generation for signal strength. The analysis of signal strength is similar to noise.

The analysis compares the variance in the signal strength level over a period of time with specific trigger points. As depicted in FIG. 7, there are five different trigger points. Each trigger point corresponds to a given range of change. For example, trigger point 1 corresponds to a range of 10% to 20% decrease in signal strength. The use of five trigger points is only by way of example. Any number of trigger points can be used. Additionally, the particular ranges for each trigger point can be varied. Furthermore, the specific RSA period used for the comparison can be changed based upon the specific needs of the system. A shorter RSA period will allow for greater control and prediction ability, however, more indications are used.

As depicted, the process begins at step 700. At step 705, the calculated RSA is compared with the initial signal strength level. If the calculated RSA is the same as the initial signal strength level, the process ends.

However, if the RSA is not the same, decision steps 715, 725, 735, 745, and 755 sequentially occur. There is a decision step for each trigger point. The control unit 105 first checks for the range corresponding to trigger point 1, then moves on to points 2, 3, 4, and finally 5. Once the control unit 105 determines that one of the percentage ranges is satisfied for the RSA and initial signal strength comparison, a flag for the corresponding trigger point is set. For example, if the RSA is between 0% and 10% below the initial signal strength value ("yes" at step 715), a flag corresponding to the trigger point 1 is set (step 720). If the RSA is between 10% and 20% below the initial signal strength value ("yes" at step 725), a flag corresponding to the trigger point 2 is set (step 730). If the RSA is between 20% and 30% below the initial signal strength value ("yes" at step 735), a flag corresponding to the trigger point 3 is set (step 740). If the RSA is between 30% and 50% below the initial signal strength value ("yes" at step 745), a flag corresponding to the trigger point 4 is set (step 750). Similarly, if the RSA is between 50% and 100% below the initial signal strength value ("yes" as step 755), a flag corresponding to the trigger point 5 is set (step 760). The process ends at step 765.

As described above, the flag can either be displayed on the control unit interface 110 or transmitted via the communication medium 120 to the central reporting station 125. FIG. 7 depicts the decision process for the comparison of the initial signal strength value and a RSA, however, two different RSA values can also be compared to generate a flag. For example, an RSAmin and RSAhour can be used instead as the decision variables. Accordingly, at step 705, instead of comparing the initial signal strength level with the RSA, a comparison of the RSAmin is made with respect to RSAhour.

In an embodiment, the control unit 105 uses a decision table stored in memory to determine which flag to set. The decision table is similar to decision table 600 and will not be described in detail again.

Additionally, a similar comparison can be made with respect to a S/N ratio and, therefore, the process will not be described again in detail.

Figure 8:
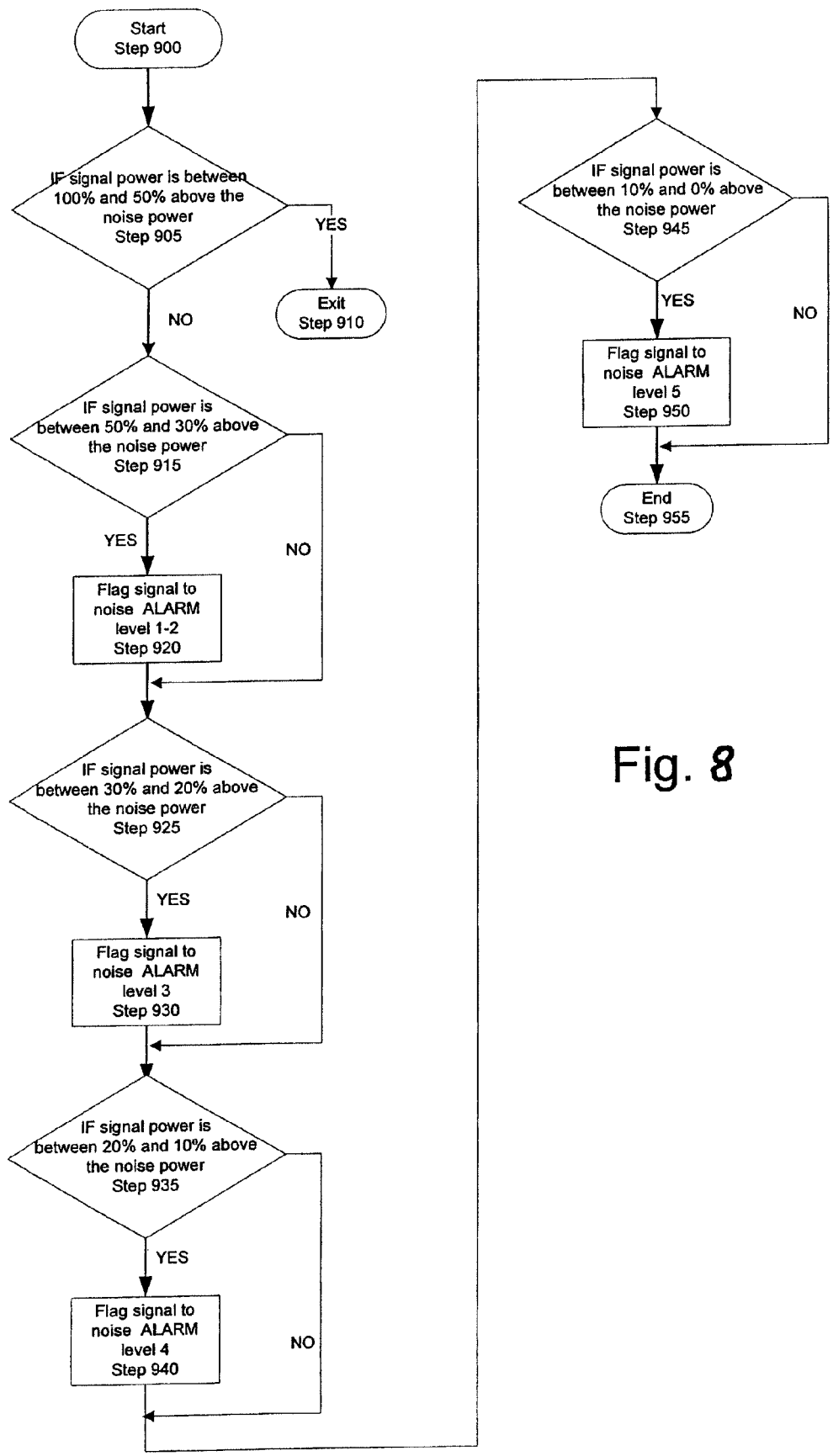
FIG. 8 is a chart for method steps in the analysis of the running average of a S/N ratio and the generation of an indication according to an embodiment of the invention.

In another embodiment, the signal strength and noise values are used to determine the S/N value for a given period. The specific S/N is then used to determine whether generate a flag. FIG. 8 illustrates an example of the decision process.

The process begins at step 900. At step 905, the control unit 105 determines if the signal power is between 100% and 50% above the noise power. If the signal power is between 100% and 50% above the noise power the process is exited at step 910. There is no trouble or expected trouble. If the signal power is less than 50% above the noise power, i.e., not between 100% and 50% above the noise power, then process moves to step 915. At step 915, the control unit 105 determines if the signal power is between 50% and 30% above the noise power. If the determination is "yes", a flag corresponding to trigger points 1 and 2 is set, at step 920. If not, the determination process continues at step 925. At step 925, the control unit 105 determines if the signal power is between 30% and 20% above the noise power. If the determination is "yes", a flag corresponding to trigger point 3 is set, at step 930. If not, the determination process continues at step 935.

At step 935, the control unit 105 determines if the signal power is between 20% and 10% above the noise power. If the determination is "yes", a flag corresponding to trigger point 4 is set, at step 940. If not, the determination process continues at step 945.

At step 945, the control unit 105 determines if the signal power is between 10% and 0% above the noise power. If the determination is "yes", a flag corresponding to trigger point 5 is set, at step 950. The process ends at step 955. Each trigger point or flag condition has a reaction associated with it either at a control panel or monitoring station.

The described system and method allows installers to make necessary adjustments to transmitter 115 and rf receiver 100 positioning and ultimately provide the optimum installation for a specific environment. The system also provides the ability to assess the suitability of a premises for rf installation as there may be some cases where a particular environment has an unacceptable noise level. After installation, different levels of service can be provided through the transmission of the indications or flags to the central reporting station.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for predicting a fault in a wireless communication path between at least one transmitter and a receiver comprising the steps of:

detecting an initial value of a characteristic of a reception signal or an initial value of a characteristic of a wireless communication path;

calculating a first running average of the characteristic for preset period of time;

comparing either the initial value of the characteristic of the reception signal or the initial value of the characteristic of the wireless communication path with the calculated first running average; and displaying an indication based upon an analysis of the comparing, wherein the calculating step includes the sub-steps of:

converting the reception signal into a digital signal;

sampling the digital signal at least a predetermined number of times;

counting a number of samples;

multiplying the samples with a weighting coefficient, said weighting coefficient for a last sample being different from the other weighting coefficients when the counter reaches a preset number; and adding the multiple samples.

2. The method for predicting a fault in a wireless communication path according to claim 1, wherein said characteristic of the reception signal is signal strength.

3. The method for predicting a fault in a wireless communication path according to claim 1, wherein said characteristic is a noise.

4. The method for predicting a fault in a wireless communication path according to claim 1, wherein said characteristic is a signal to noise ratio in the reception signal.

5. The method for predicting a fault in a wireless communication path according to claim 1, further comprising the step of:
calculating a second running average of a characteristic of a reception signal or a initial value of a characteristic of the communication path over a second preset period of time, the second preset period of time being different than the preset period of time;
comparing the first and second calculated running averages; and
displaying an indication based upon an analysis of the comparing.

6. The method for predicting a fault in a wireless communication path according to claim 1, further comprising the step of:
setting the preset period of time, the preset period of time being selected from a time period of seconds, minutes, hours, weeks and months.

7. The method for predicting a fault in a wireless communication path according to claim 1, further comprising the step of moving a location of the receiver.

8. The method for predicting a fault in a wireless communication path according to claim 1, further comprising the step of moving a location of at least one transmitter.

9. A method for predicting a fault in a wireless communication path between at least one transmitter and a receiver comprising the steps of:
detecting an initial value of a characteristic of a reception signal or an initial value of a characteristic of a wireless communication path;
calculating a first running average of the characteristic for preset period of time;
comparing either the initial value of the characteristic of the reception signal or the initial value of the characteristic of the wireless communication path with the calculated first running average; and
displaying an indication based upon an analysis of the comparing, wherein the analysis of the comparing includes the sub-steps of:
determining if a variance between the initial value and the calculated running average is within a plurality of threshold ranges, said threshold ranges representing a distinct reporting event; and
generating the indication based upon the determining, the indication being distinct for each of the plurality of threshold ranges.

10. The method for predicting a fault in a wireless communication path according to claim 9, further comprising the step of:
transmitting the indication to a remote monitoring station.

11. The method for predicting a fault in a wireless communication path according to claim 9, further comprising the step of:
responding to the indication, wherein said responding is different for each distinct indication.

12. The method for predicting a fault in a wireless communication path according to claim 11, wherein said response is moving a location of the receiver.

* * * * *